Sept. 28, 1965   D. D. KLOSS   3,208,431
AUTOMATIC LIQUID FOOD MIXER AND SUCKLING ANIMAL FEEDER
Filed March 11, 1964   5 Sheets-Sheet 1

INVENTOR.
DALE D. KLOSS
BY
Merchant, Merchant & Gould
ATTORNEYS

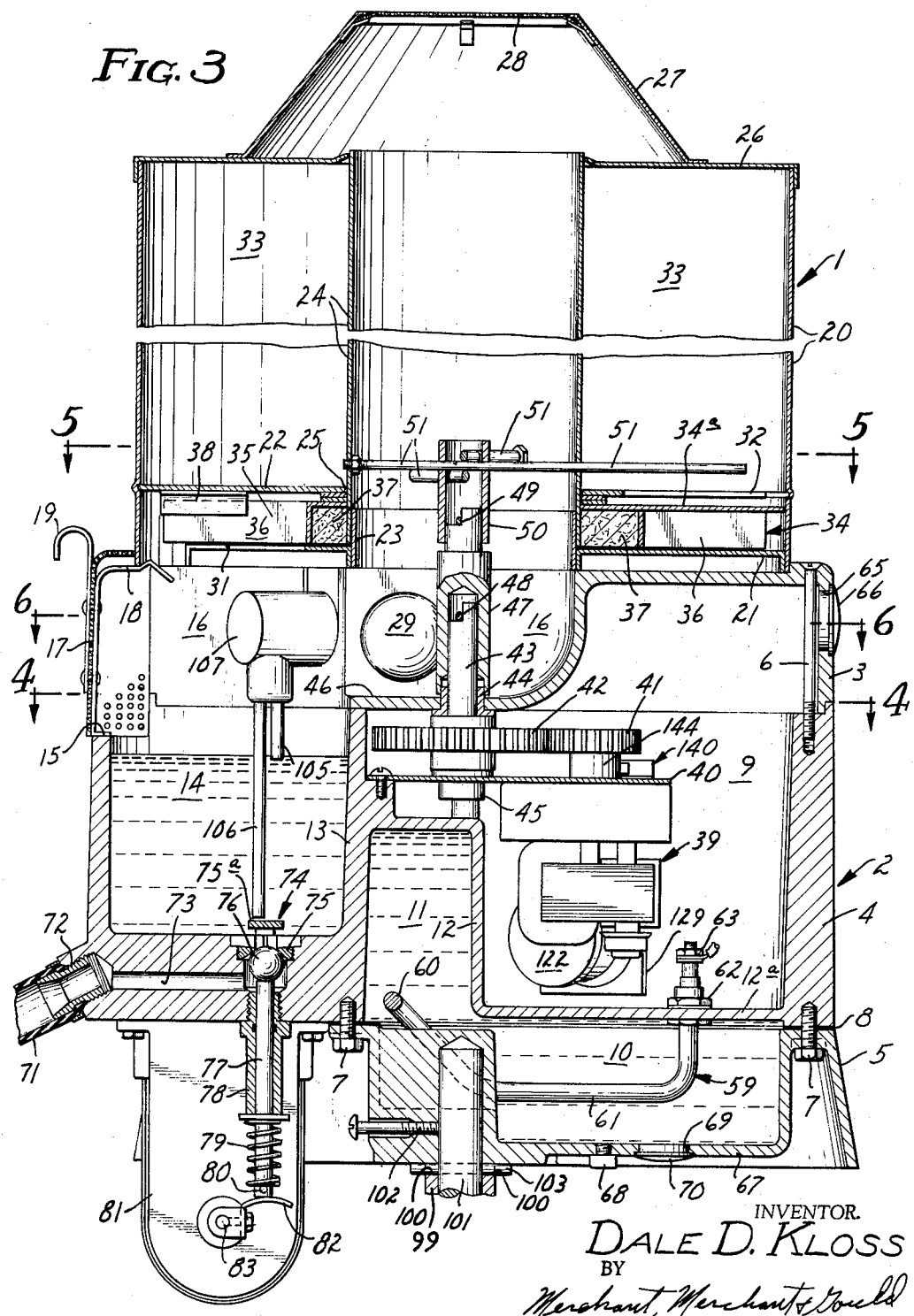

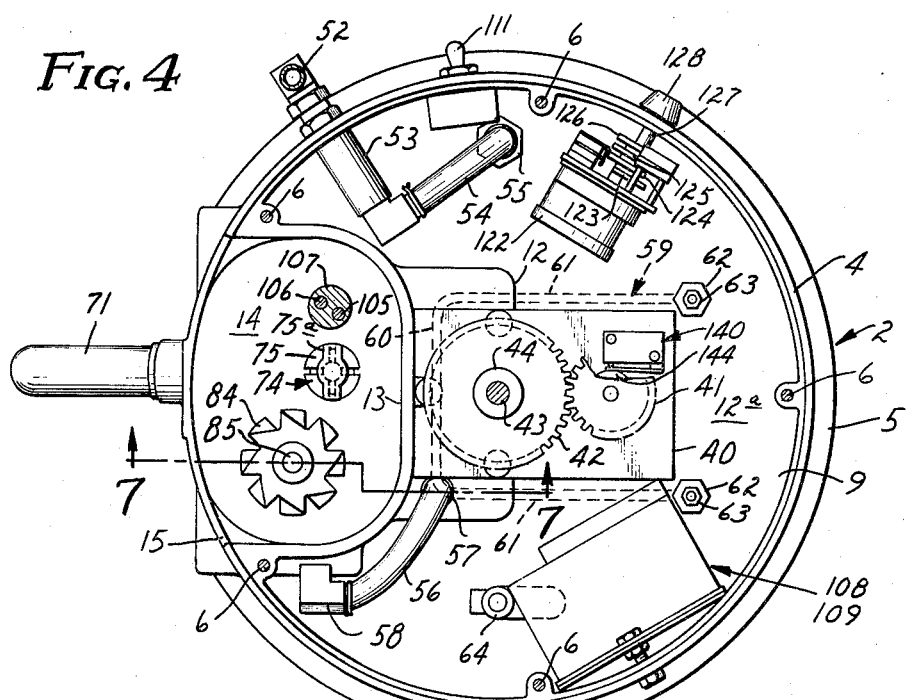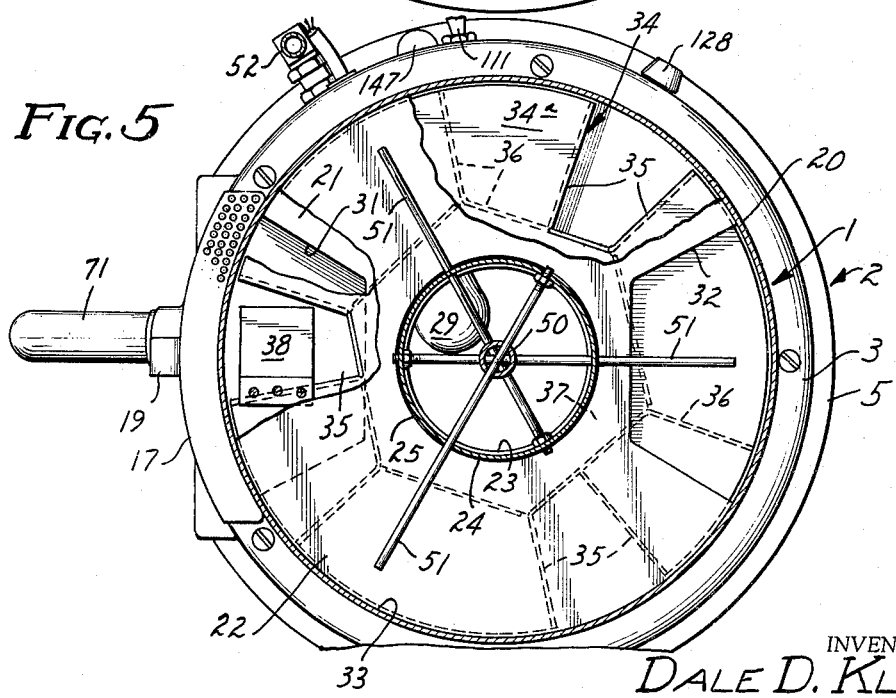

Sept. 28, 1965  D. D. KLOSS  3,208,431
AUTOMATIC LIQUID FOOD MIXER AND SUCKLING ANIMAL FEEDER
Filed March 11, 1964  5 Sheets-Sheet 4

INVENTOR.
DALE D. KLOSS
BY
Merchant, Merchant & Gould
ATTORNEYS

Sept. 28, 1965 D. D. KLOSS 3,208,431
AUTOMATIC LIQUID FOOD MIXER AND SUCKLING ANIMAL FEEDER
Filed March 11, 1964 5 Sheets-Sheet 5
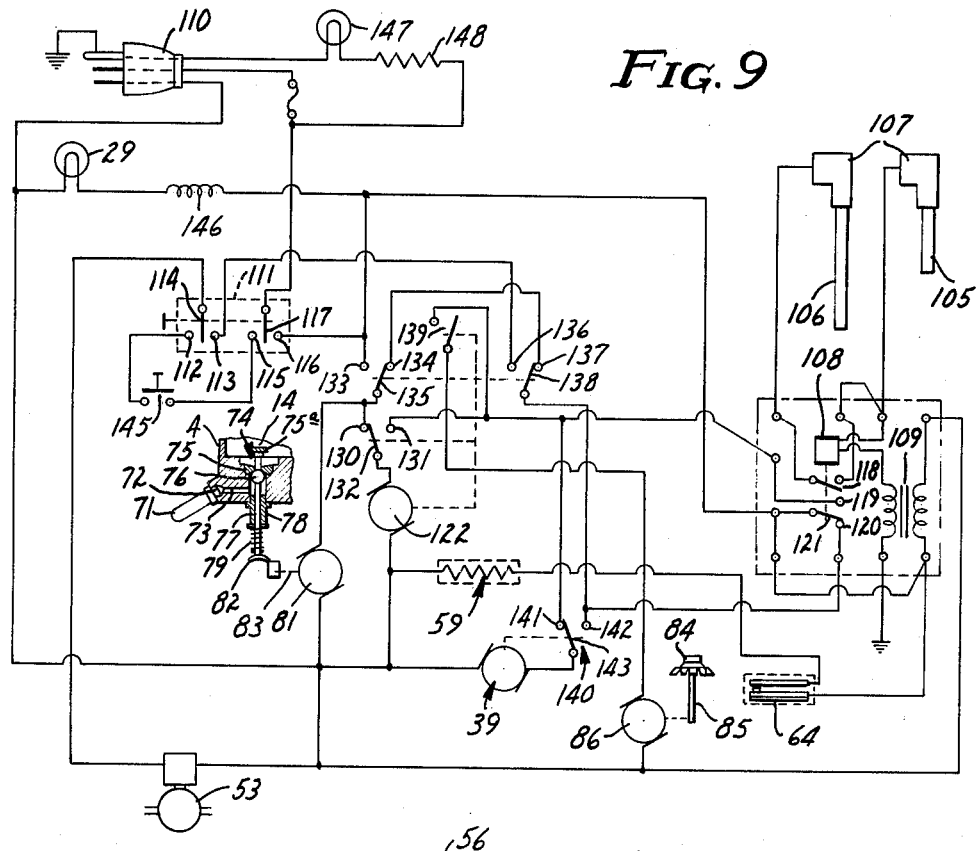
INVENTOR.
DALE D. KLOSS
BY
Merchant, Merchant + Gould
ATTORNEYS

United States Patent Office 3,208,431
Patented Sept. 28, 1965

3,208,431
AUTOMATIC LIQUID FOOD MIXER AND
SUCKLING ANIMAL FEEDER
Dale D. Kloss, Minneapolis, Minn., assignor to K & K
Manufacturing, Inc., Minneapolis, Minn., a corporation
of Minnesota
Filed Mar. 11, 1964, Ser. No. 351,152
13 Claims. (Cl. 119—51.11)

This invention relates generally to livestock feeding apparatus, and more particularly to livestock feeding devices including means for mixing dry food with liquid and delivery of the mixture to the livestock.

More specifically, this invention is in the nature of an improvement over the structure disclosed in the United States Letters Patent to Kloss, No. 3,037,481, and involves, a generally cylindrical dry food storage container and a generally cylindrical base structure axially aligned with and underlying the container, the base structure defining a liquid reservoir and a mixing and liquid food dispensing bowl, a flexible resilient feeding nipple operatively connected to the bowl, means for delivering dry food and liquid to the bowl, and cyclic control means for controlling the delivery of dry food and liquid to the bowl, whereby a new batch of liquid food will not be prepared until that which is in the bowl is consumed, and then only when a predetermined time period thereafter has elapsed. Preferably, said time period is sufficient to discourage a newly-fed animal from persevering at the feeding nipple until a subsequent batch of food is prepared.

One of the objects of this invention is the provision of an automatic liquid food mixer and animal feeder having means for heating the liquid before mixing therewith finely-divided dry food, and maintaining the mixed liquid food at a warm temperature suitable for young suckling animals.

Another object of this invention is the provision of novel means for venting the device whereby to prevent access of moisture-laden air from the mixing and dispensing bowl to the dry food in the storage container.

Another object of this invention is the provision of feeding apparatus as set forth having a dry food container which is quickly and easily removed for cleansing and servicing, and which is as quickly and easily replaced.

Another object of this invention is the provision of novel means for mounting the feeding apparatus for rotary movements on a generally vertical axis between a feeding position and a servicing position angularly spaced therefrom, and of means for releasably locking the apparatus against said rotary movements.

Still another object of this invention is the provision of a construction and arrangement wherein the operating mechanism of the apparatus is thoroughly protected from the exterior atmosphere and isolated from the liquid reservoir and mixing and dispensing bowl of the feeder.

Another object of this invention is the provision of an automatic liquid food animal feeder which occupies a minimum of space, which is highly efficient in operation, and which is rugged in construction and durable in use.

The above, and still further highly important objects and advantages of this invention will become apparent from the following detailed specification, appended claims, and attached drawings.

Referring to the drawings, which illustrate the invention, and in which like reference characters indicate like parts throughout the several views:

FIG. 3 is an enlarged axial section, taken substantially on the line 3—3 of FIG. 1, some parts being broken away;

Figure 6:
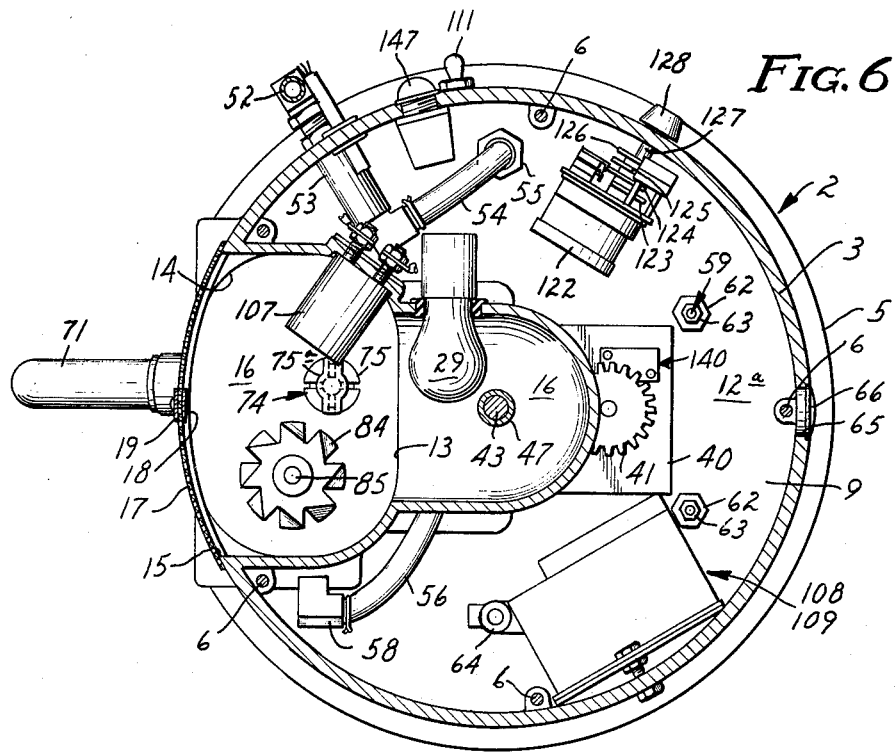
Figure 8:
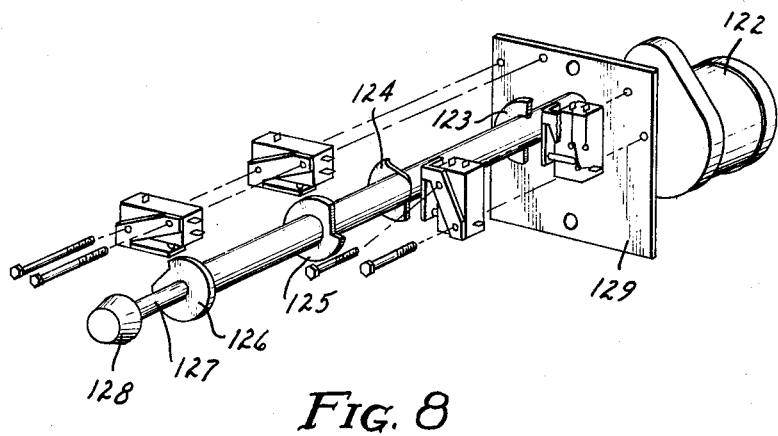

FIGS. 4, 5 and 6 are horizontal sections taken on the lines 4—4, 5—5, and 6—6 respectively of FIG. 3, on a reduced scale, some parts being broken away in FIG. 5;

FIG. 7 is an enlarged fragmentary vertical section taken substantially on the line 7—7 of FIG. 4;

FIG. 8 is an exploded view in perspective of the timing motor and some of the motor-operated control switches of this invention; and FIG. 9 is a wiring diagram of the control system of this invention.

In the preferred embodiment of the invention illustrated, a generally cylindrical dry food storage container, indicated generally at 1, is mounted on the upper end of a generally cylindrical base, indicated generally at 2, and in axial alignment therewith. The base 2 comprises axially aligned upper, intermediate and lower base sections 3, 4, and 5 respectively, the sections 3 and 4 being secured together by circumferentially spaced machine screws or the like 6, the intermediate and lower base sections being rigidly secured together by threaded bolts or the like 7, a sealing gasket 8 being interposed between the base sections 4 and 5. The base sections 3 and 4 cooperate to define a motor chamber 9, the base sections 4 and 5 cooperating to define a reservoir for liquid, such as water, the reservoir having a lower portion 10 disposed for the greater part in the lower base section 5, and an upper reservoir portion 11 formed by wall portions 12 and 13 in the base section 4. The base section 4 further defines an open-topped mixing and dispensing bowl 14, the wall portion 13 being common to both the upper reservoir portion 11 and the bowl 14. The base sections 3 and 4 further cooperate to define an opening 15 at the front portion of the base 2 and above the bowl 14, the upper base section 3 defining a passage 16 extending radially inwardly from the opening 15 to the central portion of the base section 3. The opening 15 is normally covered by a perforated cover plate or the like 17 that is releasably held in place by a spring latch or the like 18. A hook-like handle member 19 is utilized to facilitate removal and replacement of the perforated member 17.

The dry food storage container 1 comprises a cylindrical wall 20, an annular bottom wall 21, and a horizontally disposed annular partition 22 in overlying spaced parallel relation to the bottom wall 21, the bottom wall 21 and partition 22 being rigidly secured to the cylindrical wall 20 by suitable means, not shown. The bottom wall 21 is provided at its central portion with an axially extending tubular bearing 23 which journals an axially extending vent tube 24 that extends upwardly through a central opening 25 in the partition member 22 and which terminates at its upper end shortly above the level of the upper end of the cylindrical wall 20. An annular lid 26 is removably mounted on the upper end of the cylindrical wall 20, and is provided with a frusto-conical dome member 27 having a perforated plate 28 at its upper end overlying the upper end of the vent tube 24. As shown particularly in FIG. 3, the lower end of the vent tube 24 and tubular bearing 23 are in register with the radially inner end portion of the passage 16, in which inner end portion of the passage 16 is disposed a conventional germicidal lamp 29, for a purpose which will hereinafter become apparent.

The storage container 1, together with the parts associated therewith, is releasably secured to the upper base section 3 by circumferentially spaced hooks 30 riveted or otherwise rigidly secured to the cylindrical wall 20, and cooperating latching devices 30a mounted on the base section 3, the latching devices 30a being conventional in nature, and not in themselves comprising the instant invention. Hence, in the interest of brevity, further detailed showing and description thereof is omitted. With reference to FIGS. 3 and 5, it will be seen that the bottom wall 21 of the container 1 is notched to provide a generally segmental opening 31 overlying the radially outer portion of the passage 16 and the bowl 14, the partition member 22 being similarly notched to provide a discharge opening 32 from the annular storage chamber 33 defined by the cylindrical wall 20 and vent tube 24, the discharge opening 32 being diametrically opposed to the opening 31 in the bottom wall 21. Means for receiving granular or powdered dry food material, such as commercially-available milk replacer food, comprises an annular transfer device 34 that is fixed to the lower end of the vent tube 24 between the container bottom wall 21 and partition 22, for common rotation with the vent tube 24. The transfer device comprises a plate-like member 34a formed to provide a plurality of circuferentially spaced segmental notches 35, brace members 36, and a generally hexagonal core portion or washer 37 of felt or the like. The notches 35 are adapted to move alternately into registration with the openings 31 and 32, whereby to receive dry food from the annular chamber 33 through the opening 32 and to dispense the dry food into the bowl 14 through the opening 31 in the container bottom wall 21. A leaf spring 38 is riveted or otherwise rigidly secured to the bottom surface of the partition 22 in overlying spaced relation to the delivery opening 31 of the bottom wall 21, to urge the dry food material downwardly toward the bowl 14 as each notch 35 moves into register with the opening 31.

Rotary movement is imparted to the vent tube 24 and transfer device 34 by an electric motor 39 mounted in the motor chamber 9 by means of a mounting plate 40, a motor-driven pinion 41 mounted on the drive shaft of the motor 39, a cooperating gear 42 rigidly mounted on a shaft 43 that is journalled in bearings 44 and 45, the former of which is mounted in a wall portion 46 of the base section 3 and the latter of which is mounted in the mounting plate 40, and a drive coupling 47 having pin and notch connections 48 with the upper end of the shaft 43, the shaft 43 being disposed on the axis of the container 1 and base 2. The upper end of the coupling 47 is received within and has a pin and notch connection 49 with a tubular sleeve 50 coaxial with the vent tube 24. A plurality of drive and agitator rods 51 extends diametrically through the vent tube 24 and sleeves 50, extending radially of the annular storage chamber 33. As shown in FIGS. 3 and 5, one end of each of the drive and agitator rods 51 is screw threaded into the vent tube 24 and locked in place by suitable lock nuts. The motor 39 is driven intermittently as will hereinafter be described, resulting rotation of the transfer device 34 causing the leaf spring 38 to be bent upwardly to ride upon the top surface of the plate-like member 34a until a subsequent opening or notch 35 moves into register with the underlying opening 31, whereupon the leaf spring 38 will snap downwardly to dislodge any dry material which might adhere to the side walls of the underlying notch 35.

Liquid, such as water, is supplied to the reservoir from a suitable source of water under pressure, not shown, through a supply pipe or line 52 that is connected by suitable fittings to a conventional solenoid-operated valve 53 disposed within the motor chamber 9, and a conduit 54 leading from the valve 53 and communicating with the lower reservoir portion 10 through the bottom wall 12a of the base section 4, by means of a conventional water-tight fitting 55. A second conduit 56 is connected by suitable fittings 57 and 58 to the top of the upper reservoir portion 11 of the upper portion of the bowl 14 respectively. Water in the reservoir is heated to a predetermined temperature by a conventional generally U-shaped electrical heating element 59 having an intermediate portion 60 disposed in closely spaced relationship with the wall portion 13 in the upper reservoir portion 11. Laterally spaced leg portions 61 of the heating element 59 are disposed in the lower reservoir portion 10, the opposite ends of the heating element 59 extending upwardly through the wall portion 12a of the base section 4 and mounted by means of conventional water-tight fittings 62, said opposite ends of the element 59 having terminal portions 63 within the motor chamber 9 for connection to a source of electrical potential, not shown. The heating element 59 is controlled by a conventional thermostat 64 that is mounted in the bottom wall 12a, and which extends downwardly into the lower reservoir portion 10, the thermostat 64 being diagrammatically shown in FIG. 9, and the upper end thereof shown in FIGS. 4 and 6. The base sections 3, 4 and 5 are preferably made from aluminum or other suitable material having relatively high heat-conducting qualities, whereby liquid food in the bowl 14 may be maintained at a temperature substantially equal to that of the water in the reservoir portions 10 and 11, heat being conducted from the upper reservoir portion 11 to the bowl 14 through the common wall 13 therebetween. As shown in FIGS. 3 and 6, the upper base section 3 is provided with a breather opening 65 in which is mounted a louver or the like 66, for maintaining atmospheric pressure within the chamber 9 during possible changes in temperature therein. Further, the bottom wall 67 of the lower reservoir chamber 10 is provided with a drain plug 68 and a safety opening 69 that is closed by a conventional expansion plug or the like 70, see FIG. 3.

A flexible resilient suckling nipple 71 extends generally radially and angularly downwardly from the base section 4 adjacent the bottom of the bowl 14, and is connected thereto by means of a tubular fitting or the like 72, the nipple 71 communicating with the interior of the bowl 14 by means of a discharge passage 73 in which is disposed a discharge valve 74 comprising a valve seat 75 and a cooperating ball valve element 76. The ball valve element 76 is gravity-biased away from engagement with the seat 75 and is adapted to be moved into seating engagement therewith by a push rod 77 axially slidably mounted in a guide sleeve 78 that is screw threaded or otherwise rigidly secured to the base section 4, see FIG. 3. A coil compression spring 79 is interposed between the lower end of the guide sleeve 78 and a transverse pin or the like 80 at the lower end of the push rod 77 to yieldingly urge the push rod 77 in a direction to permit opening of the valve 74. Means for moving the push rod 77 in a direction to close the valve 74 against bias of the spring 79 comprises a motor 81 and a generally radial cam-like arm 82 mounted fast on the drive shaft 83 of the motor 81, the arm 82 engaging the lower end of the push rod 77. Preferably, the motor 81 is of the induction-type having relatively low torque only sufficient to close the valve 74 against bias of the spring 79, thereafter stalling and remaining in a stalled condition while energized, for appreciable time intervals without incurring motor damage. When the motor 81 is de-energized, the spring 79 moves the push rod 77 downwardly away from the ball valve element 76, permitting the valve 74 to open, and imparting limited reverse rotation to the shaft 83 of the motor 81. As shown, the valve seat 75 is formed to provide a bridge or baffle portion 75a disposed in overlying spaced relation to the ball valve element 76. Should the nipple be squeezed by a suckling animal when the valve 74 is open and the liquid in the bowl 14 at a nearly minimum level, the baffle portion 75a prevents liquid from spurting upwardly from the valve 74 to the top of the passage 16 and against the felt washer 37.

An agitator rotor 84 is disposed adjacent the bottom of the bowl 14 in laterally spaced relation to the valve 74, and is mounted fast on the upper end of a drive shaft 85 of a motor 86 disposed below the bowl 14 and enclosed in a pair of housing elements 87 and 87a suitably anchored to the bottom of the base section 4. The drive shaft 85 is journalled in a suitable bearing 88 mounted in the bottom of the bowl 14, see particularly FIG. 7, the bearing 88 having an annular sealing element 89 encompassing the drive shaft 85. The housing element cooperates with the intermediate base section 4 to define a chamber 4a, and carries a second sealing element 89a which, should liquid leak past the sealing element 89, prevents the same from reaching the motor 86. A drain opening 4b extends from the chamber 4a to atmosphere, and is provided with a screen 4c to prevent entry of foreign matter into the chamber 4a through the drain opening 4b. The agitator rotor 84 is effective in thoroughly mixing the dry food and water introduced to the bowl 14 prior to dispensing of the liquid food to the nipple 71.

Figure 1:
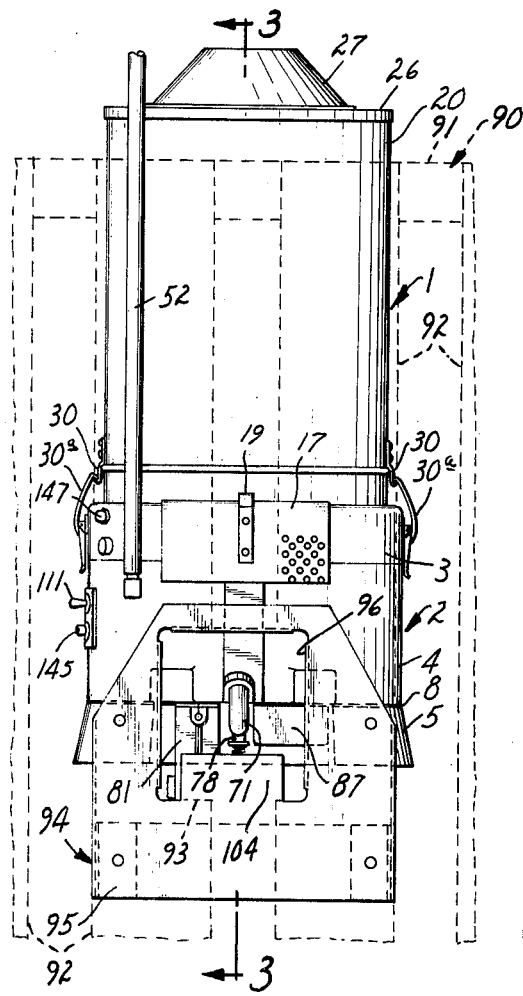
FIG. 1 is a view in front elevation of an automatic liquid food mixer and suckling animal feeder, and mounting means therefor, produced in accordance with this invention.
Figure 2:
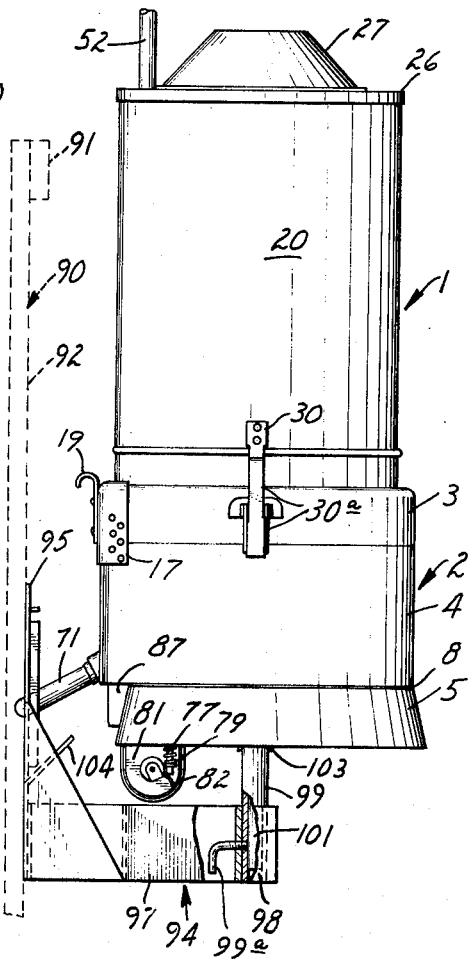
FIG. 2 is a view in side elevation, as seen from the right with respect to FIG. 1.

The above-described feeder is adapted to be mounted on a generally vertically disposed supporting structure such as a wall or fence shown by dotted lines in FIGS. 1 and 2 and indicated generally at 90. For the purpose of the present example, the supporting structure 90 is shown as comprising a horizontally disposed rail 91 and a plurality of laterally spaced vertical boards 92. As shown by dotted lines in FIG. 1, a pair of adjacent boards 92 are cut away to provide an opening 93 for access to the nipple 71 by a suckling animal, such as a calf or the like. A supporting bracket 94 comprises a vertically disposed plate-like member 95 that is adapted to be bolted or otherwise rigidly secured to said adjacent pair of the fence boards 92 and having a generally rectangular opening 96 therein in register with the opening 93 in the fence 90. The bracket 94 further includes a pair of horizontally disposed arms 97 that converge rearwardly to an apex portion 98 wherein is welded or otherwise rigidly secured an upstanding tubular socket 99 having diametrically aligned upwardly opening notches or recesses 100 in its upper end, see FIG. 3. A vertically disposed stem 101 is rigidly secured, by means of a set screw or the like 102 to the lower base section 5 and extends downwardly therefrom on the axis of the base 2 and is rotatively and axially slidably received in the upstanding socket 99. A transverse pin 103 extends through the stem 101 and is adapted to be received in the notches 100 to releasably lock the base 2 and parts carried thereby in an operative feeding position wherein the nipple 71 projects into the opening 96 in the vertically disposed plate-like member 95. Here it will be noted that the plate-like member is formed to provide a guard portion 104 that slopes upwardly toward the base 2 to prevent an animal from placing its head too far into the opening 96. When it is desired to clean or otherwise service the feeder, it is only necessary that the same be manually lifted sufficiently far to bring the transverse pin 103 out of the notches 100, and thereafter rotate the device to a position where the cover member 17 may be easily removed, and wherein the nipple 71 will be remote from the opening 96. It will be appreciated that the fence 90 provides an enclosure for the suckling animals, the bracket 94 being mounted on the exterior of the fence 90. An L-shaped set screw 99a is used to releasably lock the stem 101 against axial and rotary movements in the socket 99.

The level of liquid food in the bowl 14 and automatic operation of the above-described feeder is controlled by electrical means now to be described. A relatively short electrode or probe 105 and a relatively long probe 106 depend from a common head 107 into the bowl 14, the head being suitably mounted on the upper base section 3 within the passage 16, see particularly FIG. 3. The electrodes or probes 105 and 106 are adapted to be grounded to the base 2 by liquid in the bowl 14, the electrode 105 being interposed in a circuit comprising a relay coil 108 and the secondary winding of a transformer 109, said secondary winding also being grounded, see FIG. 9. The primary winding of the transformer 109 is interposed in a circuit comprising a conventional grounded plug 110 that is adapted to be connected to a source of electrical potential, not shown, and a manually-operated controller 111. The controller 111 comprises a pair of connected double-throw switches, one thereof including stationary contacts 112 and 113 and a movable contact 114, and the other thereof comprising stationary contacts 115 and 116 and a movable contact 117. The electrode or probe 106 provides a holding circuit for the relay coil 108 through a holding switch 118, the relay coil 108 being operatively connected to a switch comprising stationary contacts 119 and 120 and a movable contact 121.

A timing motor 122 is suitably mounted within the chamber 9, and drives a plurality of switch-operating cams 123, 124, 125 and 126 that are mounted on the output shaft 127 of the motor 122, the shaft 127 extending outwardly through the generally cylindrical wall of the base section 4 and having an adjustment knob 128 mounted on the outer end thereof. The motor 122 is connected to a mounting plate 129 which carries a plurality of switches, each of which is operatively associated with a different one of the cams 123–126. One of the cam-operated switches comprises a pair of stationary contacts 130 and 131 and a movable contact 132, the second thereof including a pair of stationary contacts 133 and 134 and a movable contact 135, a third comprising a pair of stationary contacts 135 and 137 and a movable contact 138, and a fourth thereof being a single-throw switch and indicated at 139. Still another control switch 140 involves a pair of stationary contacts 141 and 142 and a movable contact 143, the switch 140 being operated by a cam 144 on the output shaft of the motor 39. Further included in the control circuit of the feeder is a momentary contact switch 145, the purpose of which will hereinafter be described. As shown in FIG. 9, the germicidal lamp 29 is provided with the usual ballast 146, and an indicator lamp 147, connected in series with a resistor 148, is mounted in the generally cylindrical wall of the upper base section 3, to indicate that the feeder is in operative condition.

Assuming that the bowl 14 is empty, that the plug 110 is coupled to a source of electrical potential, and that the switch 111 is in a switch-open condition, as shown in FIG. 9, the various control switches are positioned as follows:

Switches 118 and 139 are open, contacts 120 and 121 are closed, contacts 130 and 132 are closed, contacts 134 and 135 are closed, contacts 137 and 138 are closed, and contacts 141 and 143 are closed. Upon manipulation of the switch 111 to close contacts 113 and 114 and contacts 116 and 117, a circuit is immediately established through the heating element 59 and its controlling thermostat 64, and the timing motor 122 is energized through closed contacts 116 and 117, contacts 120 and 121, contacts 137 and 138, contacts 134 and 135, and contacts 130 and 132. Further, the motor 81 is energized to close the valve 74, and the transformer 109 is energized. Initial operation of the timing motor 122 causes the switch contacts 136 and 138 to close to establish a circuit to open the solenoid-operated valve 53, said circuit including switch contacts 116 and 117, contacts 120 and 121, contacts 136 and 138, and contacts 113 and 114. During this initial operation of the timing motor 122, switch contacts 133 and 135 are closed to provide a holding circuit for the motors 122 and 81, after which the switch contacts 137 and 138 are opened and the switch contacts 136 and 138 close. Thereafter, during filling of the bowl 14 with water, the switch contacts 130 and 132 are opened to break the circuit to the timing motor 122 until the bowl 14 is filled.

When the level of water in the bowl 14 reaches the electrode 105, the circuit through the relay coil 108 and the secondary winding of the transformer 109 is completed to close the switch 118 and contacts 119 and 121. Closing of the switch 118 establishes a holding circuit through the relay coil 108. Closing of contacts 119 and 121 re-establishes a circuit through the timing motor 122 through contacts 131 and 132, and closes the circuit through contacts 141 and 143 to energize the dry food dispensing motor 39 which, after causing a charge of dry food to be delivered to the bowl 14, opens contacts 141 and 143 and closes contacts 142 and 143 to de-energize the motor 39. Further, switch 139 is closed establishing a circuit through the agitator motor 86, and opening of contacts 120 and 121 causes the solenoid-operated valve 53 to close. It will be noted that the open connection between the upper reservoir portion 11 and the bowl 14 through the conduit 56 permits free flow of water from the reservoir to the bowl, so that expansion of the water in the reservoir due to heating thereof does not cause an increase of pressure in the reservoir.

After a predetermined running time, the timing motor 122 opens switch 139 to de-energize the agitator motor 86, and de-energizes the valve-operating motor 81 by opening contacts 134 and 135 and contacts 137 and 138 and closing contacts 133 and 135 and contacts 136 and 138, whereby to permit the valve 74 to open and make mixed liquid food available at the nipple 71. Immediately thereafter, contacts 131 and 132 are caused to open and contacts 130 and 132 are closed to de-energize the timing motor 122.

During consumption of the liquid food by a suckling animal, the liquid level in the bowl 14 drops until contact thereof with the electrode 106 is broken, de-energizing relay coil 108 to cause the switch 118 to open and contacts 120 and 121 to close. Closing of these contacts re-establishes a circuit through the dry food dispensing motor 39 which operates only momentarily to open contacts 142 and 143 and close contacts 141 and 143, de-energizing the motor 39. A new cycle of operation, as above-described, then automatically begins.

It will be noted that, after mixing of a batch of dry food, initiation of a subsequent cycle of operation will not occur until the contents in the bowl have been consumed. The time interval for filling the bowl 14 with water, adding the dry food, mixing the dry food and water in the bowl, and releasing the check valve 74, is sufficient to discourage an animal which has just fed from suckling until a new batch of food is available. Thus, the fed animal can be easily moved out of the way of the nipple by another, hungrier animal, who is more apt to suckle until the new food batch is available. By this arrangement, a given animal does not become overfed, but obtains as many small feedings over a day's time to be adequate for healthy development of the animal.

Preferably, the connection between the cams 123-126 and the timing motor 122 is such that, if desired, the knob 128 may be manually-operated to shorten the normal operating cycle. This is usually done when checking the operation of the machine, or when new calves are being introduced to the machine.

When it is desired to clean the bowl 14, as well as the walls of the passage 16 and electrodes 105 and 106, of food particles which may have adhered thereto, the switch 111 is set to an off position as shown in FIG. 9 during the time that the bowl 14 is filled with liquid food. A suckling animal is then permitted to empty the bowl, after which the device is rotated on its axis as hereinbefore described, so that the operator may gain access to the bowl 14. The switch 111 is then manipulated to close the contacts 112 and 114 and contacts 115 and 117, to de-activate all of the circuits of the feeder except that which includes the solenoid-operated valve 53. The perforated cover member 17 is then removed, and the momentary contact switch 145 closed and held closed until the bowl 14 becomes filled with water. The operator then uses this water in the bowl to clean the bowl with the use of a brush or swab, after which the nipple 71 is removed and the water permitted to drain through the discharge passage 73. The nipple 71 may then be replaced and the operation repeated to rinse the bowl and nipple. After rinsing, the nipple and perforated cover member 17 are replaced, the switch 111 manipulated to set the machine for automatic operation, and the machine is again rotated into a feeding position.

This invention has been thoroughly tested and found to be completely satisfactory for the accomplishment of the objectives set forth; and, while I have shown and described a commercial embodiment of my automatic liquid food mixer and suckling animal feeder, it will be understood that the same is capable of modification without departure from the spirit and scope of the invention, as defined in the claims.

What I claim is:

1. In an automatic liquid food animal feeder;
    (a) structure defining a liquid food dispensing bowl having an outlet in its bottom portion and an enclosed liquid reservoir adjacent said dispensing bowl and in communication therewith,
    (b) a flexible resilient animal feeding nipple connected to said outlet,
    (c) a discharge valve controlling discharge of liquid food through said outlet to the nipple,
    (d) operating mechanism for said discharge valve,
    (e) means including an inlet valve for admitting liquid to said reservoir,
    (f) heating means for liquid in said reservoir,
    (g) and cyclic control means including a timing device responsive to a predetermined drop in liquid level in said dispensing bowl to open said inlet valve and close said discharge valve and to re-open said discharge valve to admit liquid to said nipple after a predetermined time interval following the closing of said discharge valve,
    (h) said dispensing bowl being open to atmosphere and providing a receiver for overflow of liquid from said reservoir due to expansion of liquid during the heating thereof in said reservoir.

2. The animal feeder of claim 1 in which said structure includes a common wall between said reservoir and dispensing bowl for conducting heat from said reservoir to said dispensing bowl.

3. The automatic liquid food animal feeder of claim 1 in which said structure includes a base portion defining said bowl and reservoir, and a dry food container overlying said base portion, said container having a generally central vent extending upwardly therethrough in laterally offset relation to said dispensing bowl and in communication with the open top of said bowl, and in further combination with dry food dispensing means for delivering predetermined quantities of dry food from said container to said bowl, said control means being responsive to predetermined flow of liquid from said reservoir to said bowl to energize said dry food dispensing means.

4. The automatic liquid food animal feeder of claim 3 in which said base portion and dry food container are generally cylindrical and in substantially axial alignment, said dispensing bowl being disposed adjacent a cylindrical side of said base portion, said vent defining with said container a cross sectionally annular chamber for said dry food, said container having an outlet opening in its bottom circumferentially spaced from said bowl, said dry food dispensing means defining a dry food transfer device having a compartment movable between a food receiving position underlying said outlet opening and a delivery position overlying said bowl, and mechanism for imparting delivery movements to said device.

5. The automatic liquid food animal feeder of claim 4 in which said base portion defines a passage adjacent the top of said dispensing bowl to the lower end of said vent and an opening to the exterior of said structure substantially opposite said passage, whereby air moving by natural draft upwardly through said vent is drawn through said opening and between the top of said bowl and the dry food dispensing means overlying said bowl.

6. The automatic liquid food animal feeder of claim 1 in which said discharge valve comprises a check valve element movable between open and closed positions, and in which said valve operating mechanism includes, a valve element engaging member movable toward and away from said valve element, yielding means urging said member in one direction of movement thereof, and a motor driven arm engaging said member to move said member in the opposite direction against bias of said yielding means.

7. In an automatic liquid food animal feeder:
(a) structure defining an upstanding cylindrical container for dry food and a generally cylindrical base axially aligned with said container and secured to the lower end thereof,
(b) said base defining a liquid food dispensing bowl adjacent a cylindrical wall portion of said base and having an outlet in its bottom portion, and an enclosed liquid reservoir adjacent said bowl,
(c) conduit means connecting said reservoir to said bowl,
(d) a flexible resilient animal feeding nipple connected to said outlet,
(e) a discharge valve controlling discharge of liquid food through said outlet to the nipple,
(f) operating mechanism for said discharge valve,
(g) means including an inlet valve for admitting liquid under pressure to said reservoir,
(h) heating means for liquid in said reservoir,
(i) said dispensing bowl being open to atmosphere independently of said discharge valve and adapted to receive liquid from said reservoir through said conduit,
(j) means for dispensing dry food from said container to said bowl, and
(k) cyclic control means including a timing device responsive to a predetermined drop in liquid level in said bowl to close said discharge valve, open said inlet valve to admit liquid under pressure to said reservoir and cause heated liquid therein to be conducted to said bowl to a predetermined level, close said inlet valve and render said dry food dispensing means operative to deliver dry food to said bowl to be mixed with the liquid therein, and to reopen said discharge valve after a predetermined time interval following the closing thereof.

8. The automatic liquid food animal feeder of claim 7 further characterized by support means including:
(a) a mounting bracket adapted to be secured to a supporting surface;
(b) means on said base and bracket for journalling said base on said bracket for rotation on the generally vertical axis of said base and container;
(c) and means releasably locking said base against rotation relative to said bracket.

9. The automatic liquid food animal feeder of claim 7 further characterized by an axial vent tube in said container having a lower end communicating with said bowl below the bottom of said container and an upper end extending above said container, said base having an opening in a cylindrical wall portion thereof above said bowl for entry of the exterior air to said vent tube.

10. The automatic liquid food animal feeder of claim 7 in which said container includes a discharge opening in its bottom in circumferentially spaced relation to said bowl, said means for dispensing dry food from the container to said bowl comprising a transfer member rotatable in said structure on the axis thereof and having a compartment rotatable therewith between a food-receiving position underlying said discharge opening and a food delivery position overlying said bowl, and power operated mechanism for imparting rotary movements to said transfer member.

11. The automatic liquid food animal feeder of claim 10 in which said base defines a motor chamber isolated from said bowl and reservoir, said power operated mechanism including a motor, said motor and said timing device being disposed in said chamber.

12. The automatic liquid food animal feeder of claim 11 in which said reservoir comprises a lower reservoir portion below said motor chamber, and an upper portion extending upwardly between said motor chamber and said bowl, said heating means comprising a heating element having a portion disposed in said upper reservoir portion adjacent said bowl.

13. The automatic liquid food animal feeder of claim 7 further characterized by an axial vent tube in said container and rotatable on the axis of said container, said vent tube having a lower end communicating with said bowl below the bottom of said container and an upper end adjacent the upper end of said container, said container having a discharge opening in its bottom circumferentially spaced from said bowl, said means for dispensing dry food from the container to said bowl comprising a transfer device connected to said vent tube for common rotation therewith and having a compartment movable between a food receiving position underlying said discharge opening and a food delivery position overlying said bowl, agitator means carried by said vent tube within said container, and power operated mechanism for imparting common rotary movement to said vent tube, transfer device and agitator means.

References Cited by the Examiner
UNITED STATES PATENTS

| 2,766,725 | 10/56 | Sievers | 119—51.5 |
| 3,037,481 | 6/62 | Kloss | 119—71 |
| 3,090,355 | 5/63 | Gains | 119—71 |

SAMUEL KOREN, *Primary Examiner.*

ALDRICH F. MEDBERY, *Examiner.*